United States Patent [19]

Sugihara et al.

[11] 4,337,641
[45] Jul. 6, 1982

[54] DEVICE FOR DETECTING ENGINE KNOCK

[75] Inventors: Kunihiko Sugihara, Takasho; Kenji Yoneda, Fujisawa; Shigeo Muranaka, Yokohama, all of Japan

[73] Assignee: Nissan Motor Co., Ltd., Yokohama, Japan

[21] Appl. No.: 156,745

[22] Filed: Jun. 5, 1980

[30] Foreign Application Priority Data

Jun. 6, 1979 [JP] Japan .................. 54-77322[U]

[51] Int. Cl.³ .................................. G01L 23/22
[52] U.S. Cl. ................................ 73/35; 123/406
[58] Field of Search ..................... 73/35; 123/406

[56] References Cited
U.S. PATENT DOCUMENTS

| 3,822,583 | 7/1974 | Keller et al. | 73/35 |
| 4,002,155 | 1/1977 | Harned et al. | 73/35 |
| 4,012,942 | 3/1977 | Harned | 73/35 |
| 4,111,035 | 9/1978 | West et al. | 73/35 |

Primary Examiner—Anthony V. Ciarlante
Attorney, Agent, or Firm—Schwartz, Jeffery, Schwaab, Mack, Blumenthal & Koch

[57] ABSTRACT

A device for detecting engine knock is disclosed. The device comprises a bipolar vibration sensor secured to a spark ignition internal combustion engine and has first and second outputs for generating respectively signals representing individual ringing engine vibrations due to engine knock and signals representing the background engine vibrations due to engine operation, separately. A smoothing circuit is connected to the second output side of the vibration sensor for forming a means value of the background engine vibration signals. A comparator circuit has a first input terminal connected to the first output side of the vibration sensor and a second input terminal connected to the output side of the smoothing circuit for comparing the mean value of the outputs of the smoothing circuit with the peak value of the ringing engine vibration signals. A utilization circuit is connected to the output side of the comparator circuit for controlling the driving condition of the engine in an optimum manner. The bipolar vibration sensor comprises a first vibration section having a resonance frequency corresponding to the ringing vibration frequency due to engine knock and second vibration section having a resonance frequency different from the ringing vibration frequency.

8 Claims, 4 Drawing Figures

DEVICE FOR DETECTING ENGINE KNOCK

BACKGROUND OF THE INVENTION

The present invention relates to a device for detecting engine knock for suitably controlling the operating condition of an internal combustion engine by sensing ringing vibrations produced in the engine as engine knock.

Such a device has been proposed in U.S. Pat. No. 3,822,583, No. 4,002,155 and No. 4,012,942. In the conventional internal combustion engine, the ignition timing closely related to engine knock is noted, the condition of engine knock is sensed, the spark or ignition timing is adjusted correspondingly, a permissible condition of engine knock is maintained, and fuel costs and output performance of the engine are improved. An engine knock sensing device adopting such a device is, for example, shown in FIG. 1.

FIG. 1 shows a block diagram and simple signal waveform of the engine knock sensing device. In FIG. 1, reference numeral 1 is an engine knock sensor secured to an engine body for sensing vibrations of the engine. The sensor 1 generates an AC voltage in accordance with vibrations due to engine operation, but its resonance frequency is matched with a ringing vibration frequency due to engine knock, so that the voltage generated by the ringing vibrations due to engine knock is particularly large. The output voltage of the sensor 1 is rectified by a half-wave rectifier 2, and divided and amplified in an amplifier 3, one output of which is directly supplied to a comparator circuit 4 and the other output of which is supplied to the comparator circuit 4 through a smoothing circuit 5.

The smoothing circuit 5 generates a mean value of the amplified and rectified waveform and amplifies the mean value to a predetermined multiple. The comparator circuit 4 counts the number of a peak values of the voltage supplied from the amplifier 3 exceeding the mean value voltage by every certain period, for example, each ignition interval and senses that the condition of the engine is ringing or knocking when the number becomes more than a certain number. Reference numeral 6 is an ignition timing control circuit for controlling the spark or ignition timing by an output signal of the comparator circuit 4.

In such a prior device, however, the output of the engine knock sensor is considerably different in magnitude according to the case whether the engine knock is produced or not, so that the output of the smoothing circuit 5 is considerably varied accordingly, and thus, a mean value of output of the circuit 5 at the time of engine knock becomes larger than the other time. Therefore, in the comparator circuit 4, a relative difference between the peak value and the mean value of the sensor output of the time of engine knock becomes small, so that it is difficult to compare both the values with each other, and a sensitivity to engine knock becomes lowered.

SUMMARY OF THE INVENTION

It is an object of the present invention to eliminate the above described disadvantages of the conventional engine knock sensing device.

It is another object of the present invention to provide a device for detecting engine knock with the use of a bipolar vibration sensor in which two kinds of signals generated from the sensor are separately treated, one of these signals is used as a mean value signal or a reference signal and the other thereof is used as an engine knock signal or a ringing vibration signal so as to compare these two signals with each other thereby to maintain the mean value signal almost constant regardless of the presence of engine knock, to enlarge a relative difference between the mean value and a peak value of the signal at the time of engine knock for clear comparison, and to improve the sensitivity of engine knock detection.

According to the present invention a device for detecting engine knock comprises a bipolar vibration sensor secured to a spark ignition internal combustion engine and having first and second outputs for generating respectively signals representing individual ringing engine vibrations due to engine knock and signals representing the background engine vibrations due to engine operation, separately, a smoothing circuit connected to the second output side of the vibration sensor for forming a mean value of the background engine vibration signals, a comparator circuit having a first input terminal connected to a first output side of the vibration sensor and a second input terminal connected to the output side of the smoothing circuit for comparing the mean value of the outputs of the smoothing circuit with the peak value of the ringing engine vibration signals, and a utilization circuit connected to the output side of the comparator circuit for controlling the driving condition of the engine in an optimum manner. The bipolar vibration sensor preferably comprises a first vibration section having a resonance frequency corresponding to the ringing vibration frequency due to engine knock and a second vibration section having a resonance frequency different from the ringing vibration frequency. Each of the first and the second vibration sections preferably comprises one free end portion of a single vibrating plate, which is secured onto a platform of a sensor casing. Each free end portion has a different effective vibrating length from the others. Each of the first and second vibration sections preferable comprises a piezoelectric element for converting kinetic energy into electric energy.

According to the present invention a system for detecting engine knock comprises a vibration sensing means secured to a spark ignition internal combustion engine for generating first signals representing ringing engine vibrations due to engine knock and second signals representing background engine vibrations due to engine operation, a first signal treating means for treating the ringing vibration signals to form a peak value thereof, a second signal treating means for treating the background vibration signals to form a mean value thereof, means for comparing the peak value of the ringing vibration signals with the mean value of the background vibration signal to form a difference value of these signals as the ringing vibration detection signal and means for utilizing the ringing vibration detection signal to drive the engine in an optimum condition. The vibration sensing means is preferably a bipolar vibration sensor for generating two kinds of signals in response to two kinds of vibrations. The first signal treating means preferably includes a first half-wave rectifier connected to the first output side of the bipolar vibration sensor and a first amplifier connected to the output side of the first rectifier, and the second signal treating means preferably includes a second half-wave rectifier connected to the second output side of the bipolar vibration sensor, a second amplifier connected to the output side of the second rectifier and a smoothing circuit connected to the output side of the second amplifier for forming a mean value of amplified output of the second rectifier. The utilization means is a device for controlling ignition timing to control the operation of the engine in optimum condition.

DESCRIPTION OF THE PREFERRED EMBODIMENT

Figure 1:
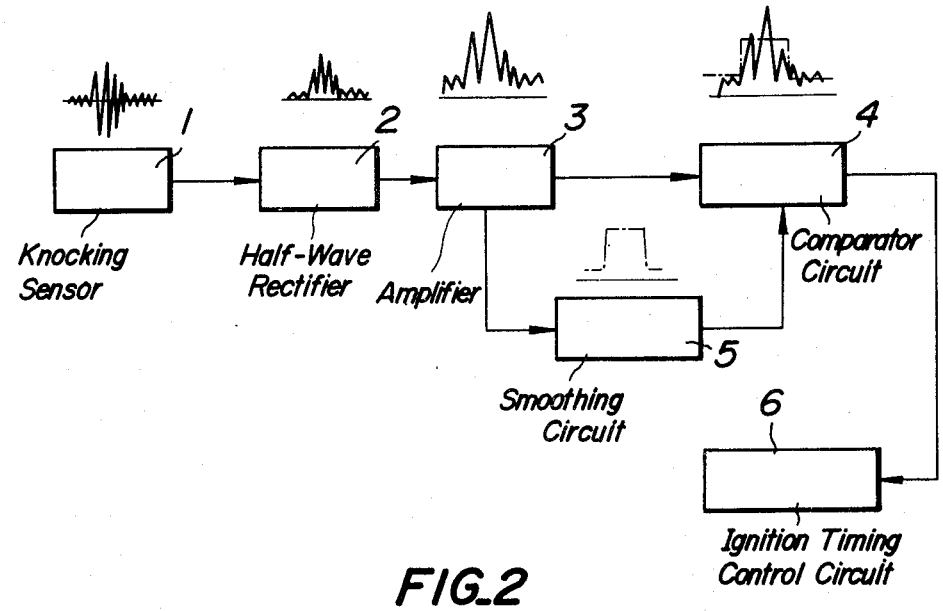
FIG. 1 is a block diagram showing a construction of conventional engine knock sensing device.

Referring now to the drawing one embodiment of a device for detecting engine knock according to the present invention will be explained.

Figure 2:
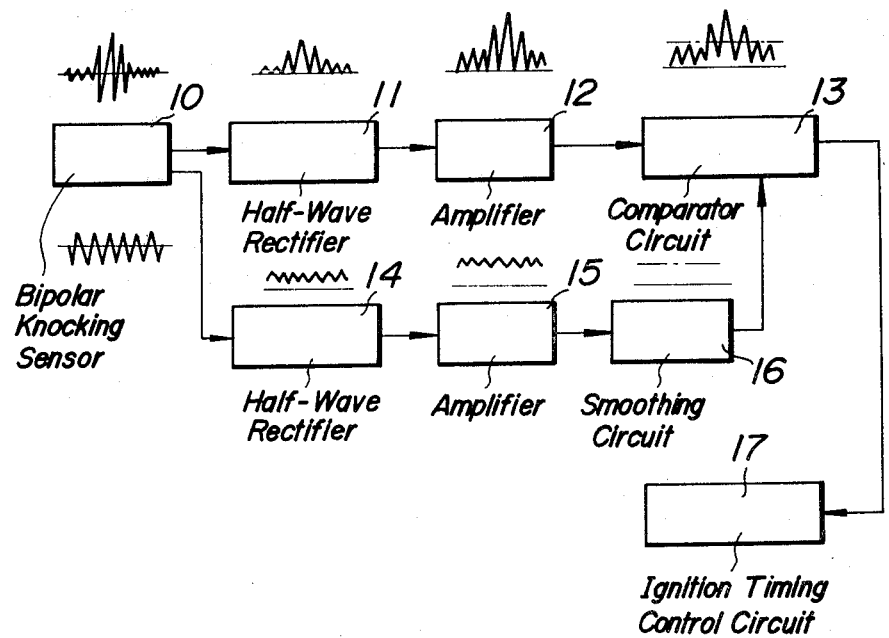
FIG. 2 is a block diagram showing a construction of a system for detecting engine knock according to the present invention.

FIG. 2 is a block diagram showing one embodiment of a system for detecting engine knock according to the present invention. In FIG. 2, reference numeral 10 is a bipolar vibration sensor which will be explained in detail later on, for generating signals for ringing engine vibrations due to engine knock and the background engine vibrations due to engine operation produced in an engine body as independent signals from each other. The engine knock signal is supplied to a comparator circuit 13 through a half-wave rectifier 11 and an amplifier 12 in the same manner as in FIG. 1. The background vibration signal is supplied to a smoothing circuit 16 through a half-wave rectifier 14 and an amplifier 15 in the same manner as in FIG. 1 so as to generate a mean value thereof. The mean value output of the smoothing circuit 16 is also supplied to the comparator circuit 13. The comparator circuit 13 detects or senses the condition of engine knock on the basis of the compared result thereby to operate an ignition timing control circuit 17.

Figure 3:
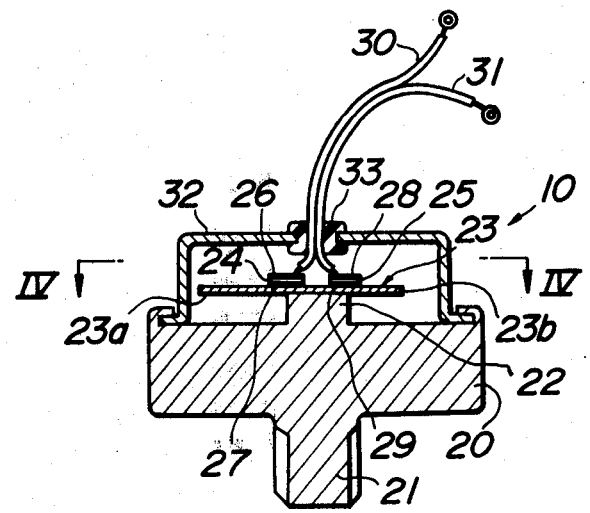
FIG. 3 is a cross-sectional view showing a bipolar vibration sensor for use in a device for detecting engine knock according to the present invention.
Figure 4:
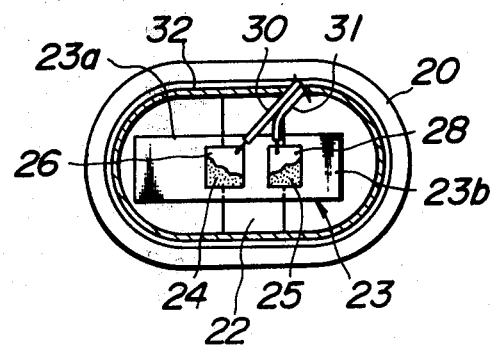
FIG. 4 is a cross-sectional view taken on line IV—IV of FIG. 3.

FIGS. 3 and 4 show the bipolar vibration sensor 10. In FIGS. 3 and 4, reference numeral 20 is a casing having a screw portion 21 screwed to an engine body (not shown), numeral 22 a platform formed almost at the center of the upper surface of the casing 20, numeral 23 a vibrating plate formed of a rectangular metal plate which is offset and secured to the platform by welding or the like, and numerals 23a, 23b vibration sections having resonance frequencies different from each other and provided on both end portions of the vibrating plate 23. In this embodiment, the resonance frequency of the vibration section 23a is almost matched with a ringing vibration frequency (5-9 KHz) produced in the engine, while the resonance frequency of the vibration section 23b is set at a comparatively high frequency so as to sense the background vibrations of the engine without receiving any influence of the ringing vibration. Reference numerals 24 and 25 are piezo-electric elements secured to the vibrating plate 23 at the base portions of each vibration section 23a, 23b. These elements 24, 25 are deformed according to vibration of each vibration section 23a, 23b of the vibrating plate 23, and when deformed, respective voltages are generated between electrodes 26, 27 and 28, 29 formed on both surfaces of the elements 24 and 25. Each voltage as the engine knock signal and the background vibration signal is supplied to lead wires 30, 31 by using the casing 20 as a ground. In the figures, reference numeral 32 is a cover, and reference numeral 33 is a bushing for hermetically sealing the casing 20.

The function of the device for detecting engine knock according to the present invention having the above construction will be explained as follows.

When the engine is under a driving or operating condition, the casing 20 is vibrated according to the vibration of the engine, so that the vibrating plate 23 is vibrated, the piezo-electric elements 24, 25 are deformed, and a voltage is generated at the lead wires 30 and 31. In this case, the vibration section 23a has a resonance frequency set to a ringing vibration frequency, so that a particularly large voltage is generated at the lead wire 30 at the time of engine knock. Moreover, the vibration section 23b has resonance frequency set to an engine background vibration frequency and a high frequency without receiving any influence of the ringing engine vibration, so that an almost constant voltage is generated at the lead wire 31 according to the background engine vibration regardless of engine knock.

An engine knock signal generated from the bipolar vibration sensor 10 is supplied to the comparator circuit 13 through the half-wave rectifier 11 and the amplifier 12. Moreover, a background vibration signal generated from the sensor 10 is smoothed in the smoothing circuit 16 after being passed through the half-wave rectifier 14 and the amplifier 15 and supplied to the comparator circuit 13 as a mean value thereof. The comparator circuit 13 compares a peak value of the engine knock signal with the mean value of the background vibration signal, and counts the number of the peak values larger than the mean value for a predetermined time thereby to detect engine knock. When the counted number is larger than a predetermined number, the engine is determined to be in an engine knock condition. When the engine is found to be in engine knock condition, the ignition timing control circuit 17 operates to retard the ignition timing, and otherwise it operates to advance the ignition timing.

In the present invention, the engine knock signal supplied to the comparator circuit 13 is the same as in the signal of the conventional device, while the background vibration signal supplied to the comparator circuit 13 is not influenced by the ringing vibration due to engine knock, so that an almost constant level of voltage signal is maintained regardless of generation of engine knock. Therefore, it becomes possible to make a relative difference between the peak value of the engine knock signal and the mean value of the background vibration signal large, and comparison and counting of these signals become clear, so that the condition of engine knock can be sensed with high sensitivity.

The use of a bipolar vibration sensor is advantageous with respect to use of, securing operation and wiring works as compared with the construction for securing two vibration sensors having different characteristics.

According to the engine knock sensing device of the present invention, an engine knock signal generated from the bipolar vibration sensor and a background vibration signal generated from the same sensor are independently treated and a peak value of the engine knock signal is compared with a mean value of the background vibration signal, so that the mean value thereof can be constantly maintained regardless of the presence of engine knock, and thus a relative difference between the peak value and the mean value is made large for comparison and counting, thereby to detect the condition of engine with high sensitivity.

What is claimed is:

1. A device for detecting engine knock comprising a bipolar vibration sensor secured to a spark ignition internal combustion engine and having first and second outputs for generating respectively a first signal representing individual ringing engine vibrations due to engine knock and a second signal representing the background engine vibrations due to engine operation, separately, a smoothing circuit connected to the second output side of the vibration sensor for forming a mean value of said second signal, and a comparator circuit having a first input terminal connected a first output side of said vibration sensor and a second input terminal connected to the output side of said smoothing circuit for comparing said mean value with the peak value of said first signal and generating a signal representing whether the engine is in engine knock condition or not.

2. A device for detecting engine knock is claimed in claim 1, wherein the bipolar vibration sensor comprises a first vibration section having a resonance frequency corresponding to the ringing vibration frequency due to engine knock and a second vibration section having a resonance frequency different from the ringing vibration frequency.

3. A device for detecting engine knock as claimed in claim 2, wherein each of the first and the second vibration sections comprises a different free end portion of a single vibrating plate, which is secured onto a platform of a sensor casing, and wherein each free end portion has a different length from the other.

4. A device for detecting engine knock as claimed in claim 2 or 3, wherein each of the first and the second vibration sections comprises a piezo-electric element for converting kinetic energy into electric energy.

5. A system for detecting engine knock comprising a vibration sensing means secured to a spark ignition internal combustion engine for generating a first signal representing ringing engine vibrations due to engine knock and a second signal representing background engine vibrations due to engine operation, a first signal treating means for treating said first signal to form a peak value thereof, a second signal treating means for treating said second signal to form a mean value thereof, means for comparing said peak value with said mean value to form a difference value of these signals as the ringing vibration detection signal and means for utilizing the ringing vibration detection signal to control the operation of engine in an optimum condition.

6. A system for detecting engine knock as claimed in claim 5, wherein said vibration sensing means is a bipolar vibration sensor for generating said first and second signals separately.

7. A system for detecting engine knock is claimed in claim 5, wherein said first signal treating means includes a first half-wave rectifier to receive said first signal and a first amplifier connected to the output side of said first rectifier, and the second signal treating means includes a second half-wave rectifier to receive said second signal, a second amplifier connected to the output side of said second rectifier and a smoothing circuit connected to the output side of said second amplifier for forming a mean value of amplified output of said second amplifier.

8. A system for detecting engine knock as claimed in claim 5, wherein said utilization means is a device for controlling ignition timing to make the operation of engine in optimum condition.

* * * * *